(12) United States Patent  (10) Patent No.: US 7,850,111 B2
Prokscha et al.  (45) Date of Patent: Dec. 14, 2010

(54) BELT RETRACTOR FOR A SAFETY BELT SYSTEM

(75) Inventors: Martin Prokscha, Schwaebisch Gmuend (DE); Wolfgang Holbein, Alfdorf (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 12/070,613

(22) Filed: Feb. 20, 2008

(65) Prior Publication Data

US 2008/0210803 A1 Sep. 4, 2008

(30) Foreign Application Priority Data

Feb. 21, 2007 (DE) .................. 10 2007 008 495

(51) Int. Cl.
*B65H 75/48* (2006.01)
(52) U.S. Cl. .................. 242/374; 242/375.1; 242/375.3
(58) Field of Classification Search .................. 242/382, 242/384.7, 396.1, 390.8, 390.9, 375.1, 375.3, 242/374; 280/806, 807; 297/475, 476, 477, 297/478
See application file for complete search history.

(56) References Cited

U.S. PATENT DOCUMENTS

| | | | | |
|---|---|---|---|---|
| 5,495,993 A | * | 3/1996 | Hibata | 242/382.2 |
| 5,904,371 A | * | 5/1999 | Koning | 280/806 |
| 6,848,717 B2 | | 2/2005 | Bullinger et al. | |
| 6,863,235 B2 | * | 3/2005 | Koning et al. | 242/379.1 |
| 6,910,653 B2 | | 6/2005 | Tanji | |
| 7,384,014 B2 | * | 6/2008 | Ver Hoven et al. | 242/382.2 |
| 2001/0004094 A1 | * | 6/2001 | Hanna et al. | 242/382.2 |
| 2001/0017330 A1 | * | 8/2001 | Fujii et al. | 242/390.8 |
| 2001/0038054 A1 | * | 11/2001 | Mori et al. | 242/382.2 |

FOREIGN PATENT DOCUMENTS

| | | |
|---|---|---|
| DE | 10204475 | 8/2003 |
| EP | 1529699 | 5/2005 |

\* cited by examiner

*Primary Examiner*—Sang Kim
(74) *Attorney, Agent, or Firm*—Tarolli, Sundheim, Covell & Tummino LLP (57) ABSTRACT

A belt retractor for a safety belt system has a frame (2), a belt reel (4) rotatably mounted in the frame (2) for receiving a belt webbing, a reversible belt tensioning unit with a motor (8), an irreversible belt tensioning unit, and a coupling mechanism, by means of which the reversible belt tensioning unit can be coupled to the belt reel (4) and which can be deactivated and reactivated, the coupling mechanism being deactivated when the irreversible belt tensioning unit is activated and the coupling mechanism being reactivated after termination of the irreversible belt tensioning.

21 Claims, 7 Drawing Sheets

BELT RETRACTOR FOR A SAFETY BELT SYSTEM

TECHNICAL FIELD

This invention relates to a belt retractor for a safety belt system, comprising a belt reel rotatably mounted in a frame for receiving a belt webbing, a reversible belt tensioning unit with a motor, an irreversible belt tensioning unit, and a coupling mechanism by means of which the reversible belt tensioning unit can be coupled to the belt reel.

BACKGROUND OF THE INVENTION

In modern belt retractors, both a reversible belt tensioning unit and an irreversible belt tensioning unit are used for driving the belt reel in wind-up direction, when a vehicle condition is regarded as critical, in order to eliminate a slack in the safety belt and bring the vehicle occupant into an upright position. The reversible belt tensioning unit is configured as a pretensioner, which in the case that the critical vehicle situation does not lead to an accident returns the belt reel to its starting position. The irreversible belt tensioning unit, however, only is activated in actual accident situations, which subsequently require the replacement of the entire belt retractor.

In addition, modern belt retractors include a force limitation system which limits the force maximally exerted by the belt onto the body of the vehicle occupant, in that it permits a certain withdrawal of belt webbing from a defined force acting in the belt webbing. If the irreversible belt tensioning unit now is activated as long as the reversible belt tensioning unit still is coupled with the belt reel, the succeeding limitation of force not only requires to overcome the resistance provided by the force limitation system, but also to turn back the reversible belt tensioning unit against its direction of action. As a result higher forces than desired and provided by the design of the force limitation system are generated in the safety belt.

This invention creates a belt retractor, in which during a force limitation phase after a tensioning effected by the irreversible belt tensioning unit, the reversible belt tensioning unit reliably is separated from the belt reel, but is again operable after such force limitation phase.

BRIEF SUMMARY OF THE INVENTION

According to the invention, a belt retractor for a safety belt system has a frame, a belt reel rotatably mounted in the frame for receiving a belt webbing, a reversible belt tensioning unit with a motor, an irreversible belt tensioning unit, and a coupling mechanism, by means of which the reversible belt tensioning unit can be coupled to the belt reel and which can be deactivated and reactivated, the coupling mechanism being deactivated when the irreversible belt tensioning unit is activated and the coupling mechanism being reactivated after termination of the irreversible belt tensioning.

Because the coupling mechanism is essential for power transmission from the reversible belt tensioning unit to the belt reel, the inventive design provides for separating the reversible belt tensioning unit from the belt reel when the irreversible belt tensioning unit is activated, so that during the subsequent limitation of force the reversible belt tensioning unit exerts no influence on the force necessary for withdrawing the belt webbing. During the deactivation phase of the coupling mechanism, the reversible belt tensioning unit cannot again be coupled to the belt reel. After termination of the irreversible belt tensioning, the coupling mechanism is activated again, so that in the case of a reactivation of the reversible belt tensioning unit, a functional connection between the reversible belt tensioning unit and the belt reel can again be effected. The inventive aspect provides the advantage that the reversible belt tensioning unit is prevented from influencing the force limitation, but after a minor accident, in which the irreversible belt tensioning unit has been activated, but the vehicle still is roadworthy, at least the reversible belt tensioning unit is operable again.

Preferably, the irreversible belt tensioning unit is decoupled from the belt reel after termination of the irreversible belt tensioning. This ensures that the belt reel again is freely rotatable after a force limitation phase.

In accordance with a preferred embodiment, the coupling mechanism includes a clutch disk and a first brake element for the clutch disk, wherein a deactivation element is provided, which moves the first brake element into a passive position, in which it does not act on the clutch disk, when the irreversible belt tensioning unit is activated. The brake element is essential for the function of the coupling mechanism, in that it at least briefly retains the clutch disk and thus effects a relative rotation of the clutch disk with respect to a wheel driven by the motor. Due to the rotation, a coupling between wheel and belt reel is achieved, for instance by swivelling pawls arranged on the wheel into teeth of the belt reel. By deactivating the first brake element, the entire coupling mechanism between the reversible belt tensioning unit and the belt reel thus is deactivated, as the clutch disk no longer is retarded by the brake element and thus can freely rotate with the wheel or can take its non-rotated starting position relative to the same. Thus, the reversible belt tensioning unit is separated from the belt reel and during the force limitation phase does not influence the force necessary for withdrawing the belt webbing. In particular, it is provided that the first brake element is fixed in its passive position after it has reached the same.

Preferably, the deactivation element includes a prestressed spring arm, which is released by an activation means coupled with the irreversible belt tensioning unit. The activation unit for instance is a gear wheel which is driven by the irreversible belt tensioning unit. When the irreversible belt tensioning unit is activated, the brake element thus is automatically moved into its passive position.

A particularly simple variant of the reactivation of the coupling mechanism is obtained in that a second brake element is provided, which first is held in a passive position in which it does not act on the clutch disk and after termination of the irreversible belt tensioning acts on the clutch disk. After termination of the irreversible belt tensioning, this second brake element assumes the function performed by the first brake element before activation of the irreversible belt tensioning unit, namely to at least briefly retain the clutch disk and thus effect a coupling between a wheel driven by the motor of the reversible belt tensioning unit and the belt reel.

Preferably via a friction clutch, the second brake element is mounted on an activation wheel driven by the motor. By rotating the activation wheel, the brake element can be rotated and thus act on the clutch disk.

The activation wheel in particular is a gear wheel of a gear connected with the motor, i.e. part of the reversible belt tensioning unit.

In accordance with a preferred embodiment, the second brake element can be transferred from the passive position into an activated position by a reverse rotation of the gear. Reverse rotation here is meant to be a rotation against the tensioning direction of the reversible belt tensioning unit.

To prevent that the second brake element can act on the clutch disk already before or during activation of the irreversible belt tensioning unit, the second brake element is held in its passive position by a releasable holding element mounted on the frame, in accordance with a first aspect of the invention; i.e. the holding element is releasably mounted on the frame. When the irreversible belt tensioning unit is activated, the holding element is released, and the second brake element can take its activated position.

In accordance with an alternative aspect, the second brake element initially is held in its passive position by the first brake element. This results in a particularly simple design with few components.

To prevent the second brake element from again leaving its activated position and thereby deactivating the coupling mechanism, a blocking element preferably is provided, which fixes the second brake element in the activated position after activation thereof.

Both brake elements can be formed as levers which in their respective activated position engage in braking teeth coupled with the clutch disk. This results in a mechanically simple structure, in which the clutch disk is retarded reliably.

In accordance with a first variant, the first brake element is pivotally mounted on the frame. Initially, the first brake element is operatively connected with the clutch disk such that it prevents the same from rotating or at least retards the same for coupling the reversible belt tensioning unit with the belt reel. When the irreversible belt tensioning unit is activated, the brake element is swivelled such that it no longer acts on the clutch disk.

Preferably, a spring is provided, which urges the first brake element into its activated position. The spring ensures that in a situation which requires a reversible belt tensioning, the reversible belt tensioning unit can couple to the belt reel without delay.

To ensure that after activation of the irreversible belt tensioning unit the first brake element is moved into a passive position in which it will remain thereafter, the force exerted by the spring on the first brake element should be smaller than the prestressing force of the spring arm of the deactivation element. In this way, the pretension of the spring arm is sufficient to fix the first brake element in its passive position.

Preferably, the force exerted by the spring on the first brake element is larger than the frictional force between the second brake element and the activation wheel. Thus, it is possible that the second brake element initially is held in the passive position by the first brake element.

In accordance with a second variant, the first brake element is mounted on an activation wheel driven by the motor, in particular fixed by means of a friction clutch. In this case, the frictional force between the first brake element and the activation wheel should be smaller than the prestressing force of the spring arm of the deactivation element.

BRIEF DESCRIPTION OF THE PREFERRED EMBODIMENT

Figure 1:
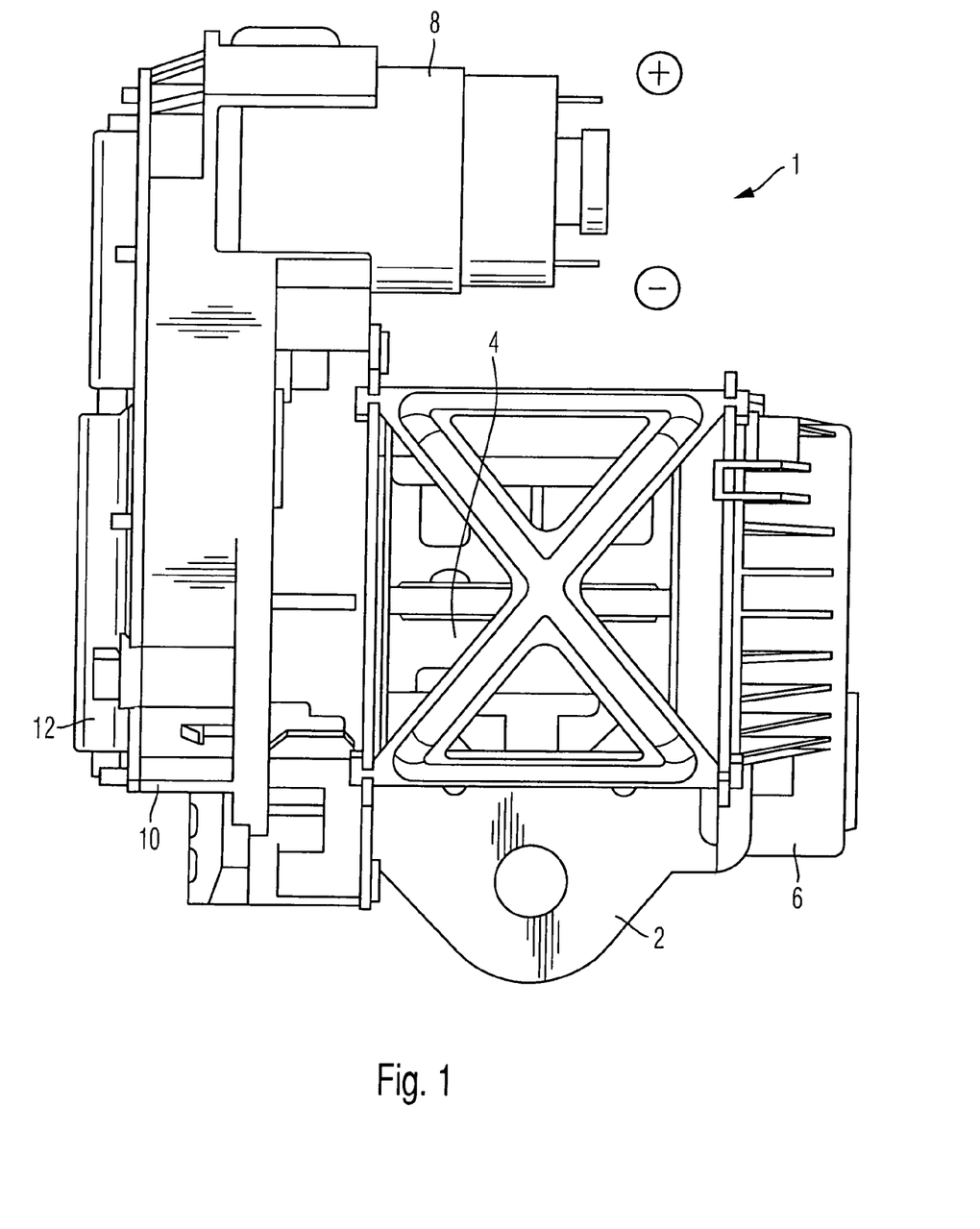
FIG. 1 shows a view of a belt retractor of the invention.
Figure 2:
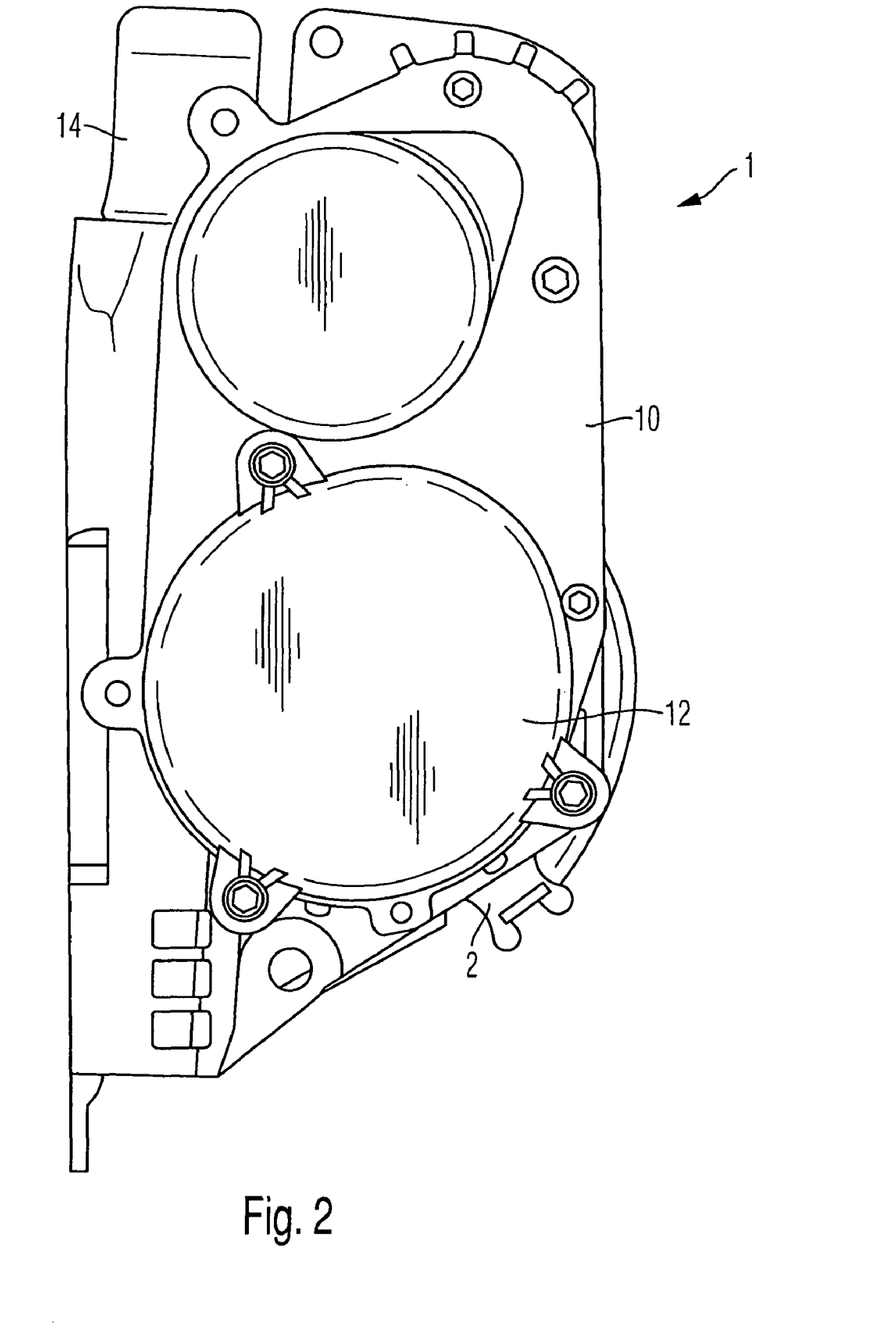
FIG. 2 shows a plan view of the tensioner side of the belt retractor of FIG. 1.

FIGS. 1 and 2 show a belt retractor 1 of the invention with a belt reel 4 rotatable mounted in a frame 2, which serves to receive a belt webbing not shown in the Figures. The belt retractor 1 comprises a blocking system 6 for blocking the belt reel 4, which is disposed on the right in FIG. 1, and a reversible belt tensioning unit, which includes a motor 8 and is arranged in a housing 10 together with an irreversible belt tensioning unit. Reference numeral 12 designates a housing for a drive spring. The irreversible belt tensioning unit includes a piston 16 arranged in a cylinder 14 (FIG. 2), which can be accelerated along the cylinder 14 by compressed gas generated by a pyrotechnical drive 17 (see FIG. 3). In contrast to the drawing, any other irreversible belt tensioning units are of course also conceivable, such as rotary tensioners, ball, strap or cable tensioners.

Figure 3:
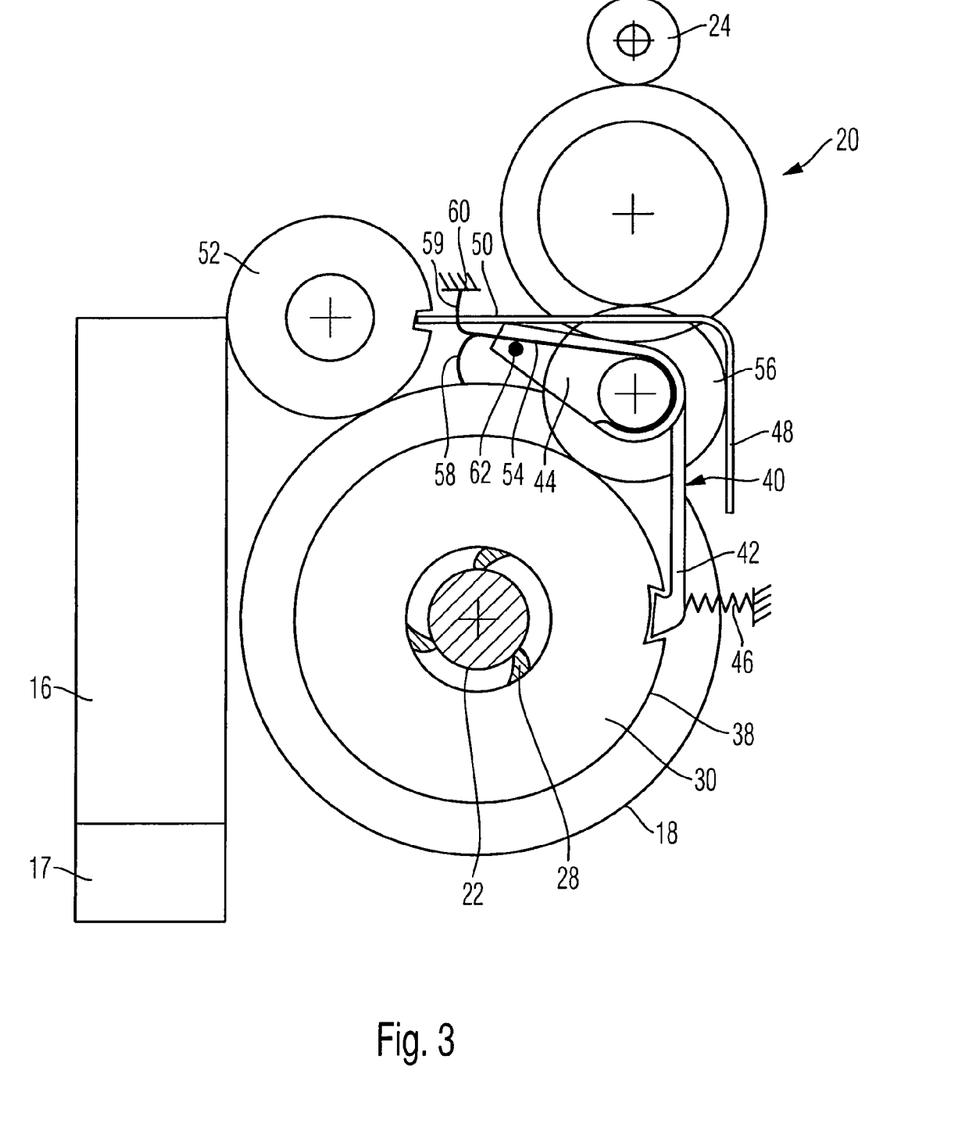
FIG. 3 shows a schematic plan view of the belt retractor components relevant for the tensioning functions in a condition before activation of the irreversible belt tensioning unit.

FIG. 3 shows the irreversible belt tensioning unit and a detailed view of the reversible belt tensioning unit. The same comprises a wheel 18, which via a gear 20 arranged in the housing 10 is connected with a drive pinion 24 of the motor 8. A pinion 22, which has an external toothing (see also FIG. 4), is non-rotatably connected with the belt reel 4 (or a force limiter such as a torsion bar coupled with the belt reel 4). The external toothing is part of a coupling mechanism, by means of which a driving torque can be transmitted from the wheel 18 to the belt reel 4.

Figure 4:
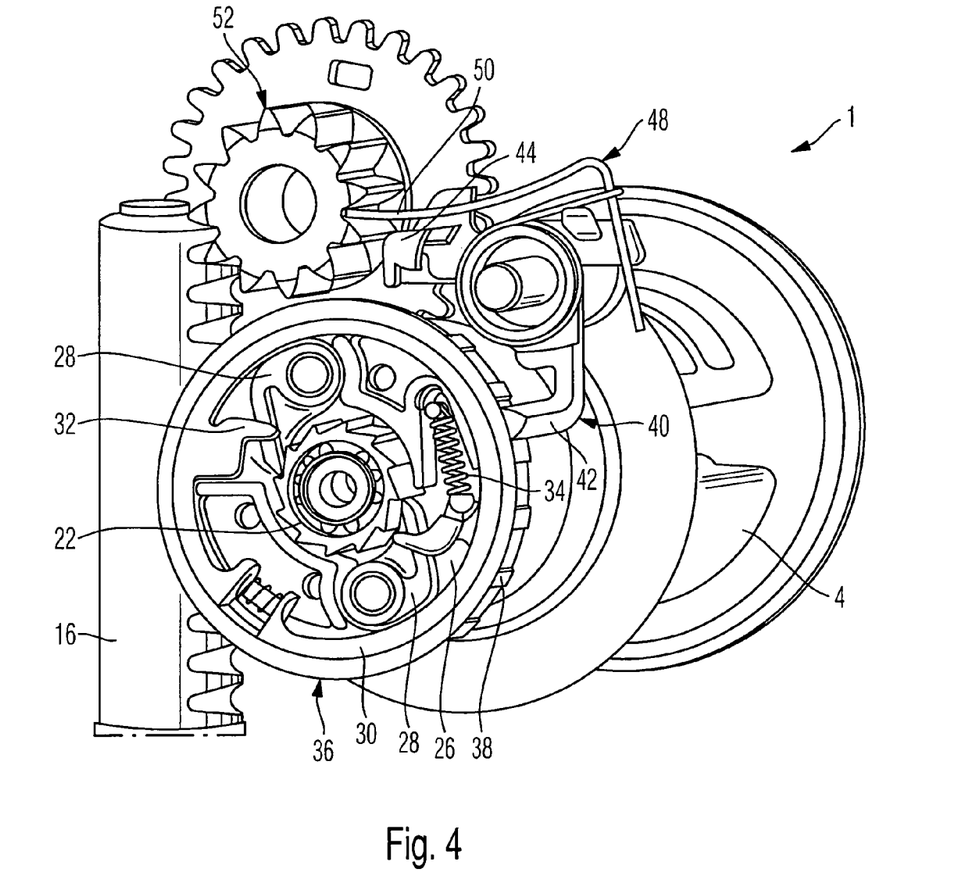
FIG. 4 shows a perspective view of a few components relevant for the tensioning functions, likewise in a condition before activation of the irreversible belt tensioning unit.

The coupling mechanism merely indicated in FIG. 3 is shown in detail in FIG. 4, with a few other components having been omitted here for reasons of clarity. The wheel 18 is rigidly connected with a supporting member 26, on which a plurality of pawls 28 are pivotally mounted. Axially beside the wheel 18, a clutch disk 30 is arranged, which is provided with control lugs 32 protruding into the supporting member 26 such that they can cooperate with the pawls 28. Between the clutch disk 30 and the supporting member 26, at least one return spring 34 is provided.

In addition, the clutch disk 30 is coupled with a braking wheel 36 mounted on the same via a slip clutch, which braking wheel includes braking teeth 38 on its circumference.

A first brake element 40 in the form of a two-armed lever with a first lever arm 42 and a second lever arm 44 is pivotally mounted on the frame 2 and/or on the housing 10. By a spring 46, here a compression spring, which is supported by the frame 2, the first brake element 40 is urged into an activated position, in which the first lever arm 42 is in engagement with the braking teeth 38 (see FIG. 3).

Furthermore, a deactivation element 48 is provided, which includes a prestressed spring arm 50 and is likewise retained on the frame 2 and on a housing 10, respectively. The spring arm 50 engages in a recess or toothing of a gear wheel 52, which can be driven by the piston 16 of the irreverisble belt tensioning unit. Furthermore, the gear wheel 52 can be coupled to the belt reel 4 in a manner not illustrated here.

Via a friction clutch, a second brake element 54 is mounted on an activation wheel 56 driven by the motor 8, which is part of the gear 20. At its free end, the second brake element 54 includes a first hook 58 and a second hook 59, which are angled in different directions. In principle, the second brake element 54 can be swivelled with the activation wheel 56, but in the condition before activating the irreversible tensioning unit as shown in FIG. 3 is held in a passive position by a releasable holding element 60 mounted on a frame 2. Alternatively, the second brake element 54 can be held in the passive position as shown in FIG. 3 by a holding pin 62 mounted on the second lever arm 44 of the first brake element 40. In this case, the force exerted by the spring 46 on the first brake element 40 need to be greater than the frictional force between the second brake element 54 and the activation wheel 56.

The supporting member 26, the return spring 34, the pawls 28, the clutch disk 30 (including control lugs 32 and slip clutch), the braking wheel 36 as well as the first brake element 40 and the second brake element 54 form the above-mentioned coupling mechanism together with the external toothing of the pinion 22.

Subsequently, the operation of the reversible belt tensioning unit formed by the motor 8 and the gear 20, the operation of the coupling mechanism and the operation of the irreversible belt tensioning unit will be described. In a vehicle situation regarded as critical, the motor 8 will be activated, which (by means of the remaining gear 20) rotates the activation wheel 56 in clockwise direction, whereby the wheel 18 is driven in anti-clockwise direction. The second brake element 54 does not move with the activation wheel 56, as it is held in its passive position by the holding element 60 or the holding pin 62.

As the spring 46 acts on the first brake element 40, the first brake element 40, however, is in its activated position, in which the first lever arm 42 engages in the braking teeth 38 of the braking wheel 36. Therefore, the braking wheel 36 is stopped. Between the braking wheel 36 and the clutch disk 30 a frictional connection exists, which is stronger than the restoring force exerted by the return spring 34, so that the clutch disk 30 initially likewise is retained, while the wheel 18 and hence the supporting member 26 rotates in anti-clockwise direction. As a result, the pawls 28 abut against the control lugs 32 and are brought in engagement with the external teeth of the pinion 22. When the pawls 28 have reached the tooth base of the pinion 22, the wheel 18 is coupled with the belt reel 4, so that the motor 8 can drive the belt reel 4 in wind-up direction of the belt webbing. When the pawls 28 are engaged completely, the maximum possible rotation between the clutch disk 30 and the supporting member 26 or the wheel 18 has been reached, so that in the case of the further rotation the still fixed braking wheel 36 will slip through on the clutch disk 30, which now rotates in synchronism with the wheel 18.

If an accident does not happen after pretensioning, the motor 8 will briefly be operated in the opposite direction of rotation. Due to the reverse rotation of the gear 20, the coupling mechanism is released, and the reversible belt tensioning unit is ready for the next pretensioning.

If, on the other hand, the reversible belt tensioning unit is not released during or directly after pretensioning, but the irreversible belt tensioning unit is activated, the pyrotechnical drive 17 will generate a compressed gas which accelerates the piston 16 along the cylinder 14. Then, the teeth of the piston 16 engage in the teeth of the gear wheel 52, whose rotation is transmitted to the belt reel 4, for instance via a second toothing. As a result, the belt reel 4 is driven in wind-up direction of the belt webbing.

Figure 5:
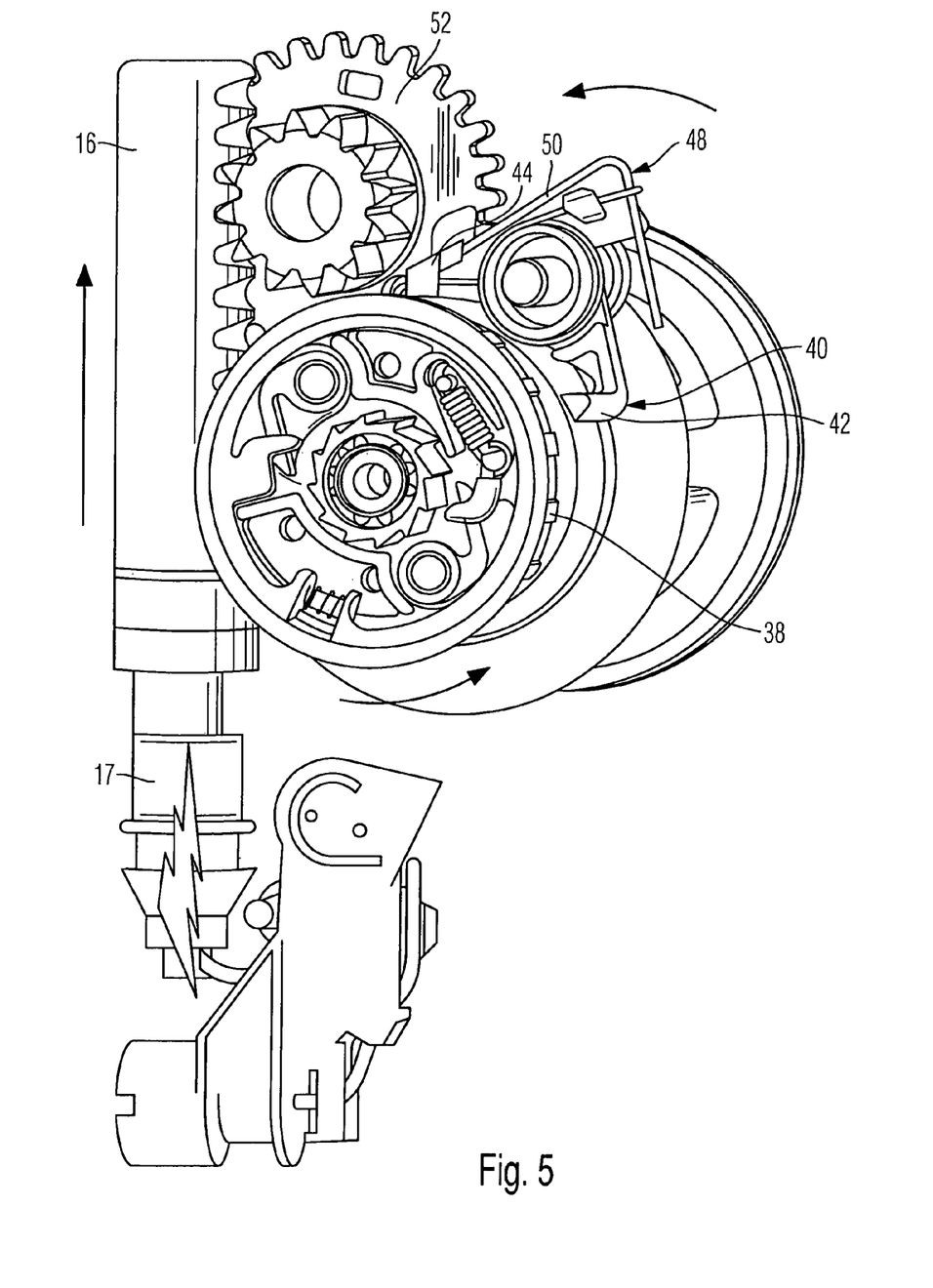
FIG. 5 shows a perspective view similar to FIG. 4, but after activation of the irreversible belt tensioning unit.
Figure 6:
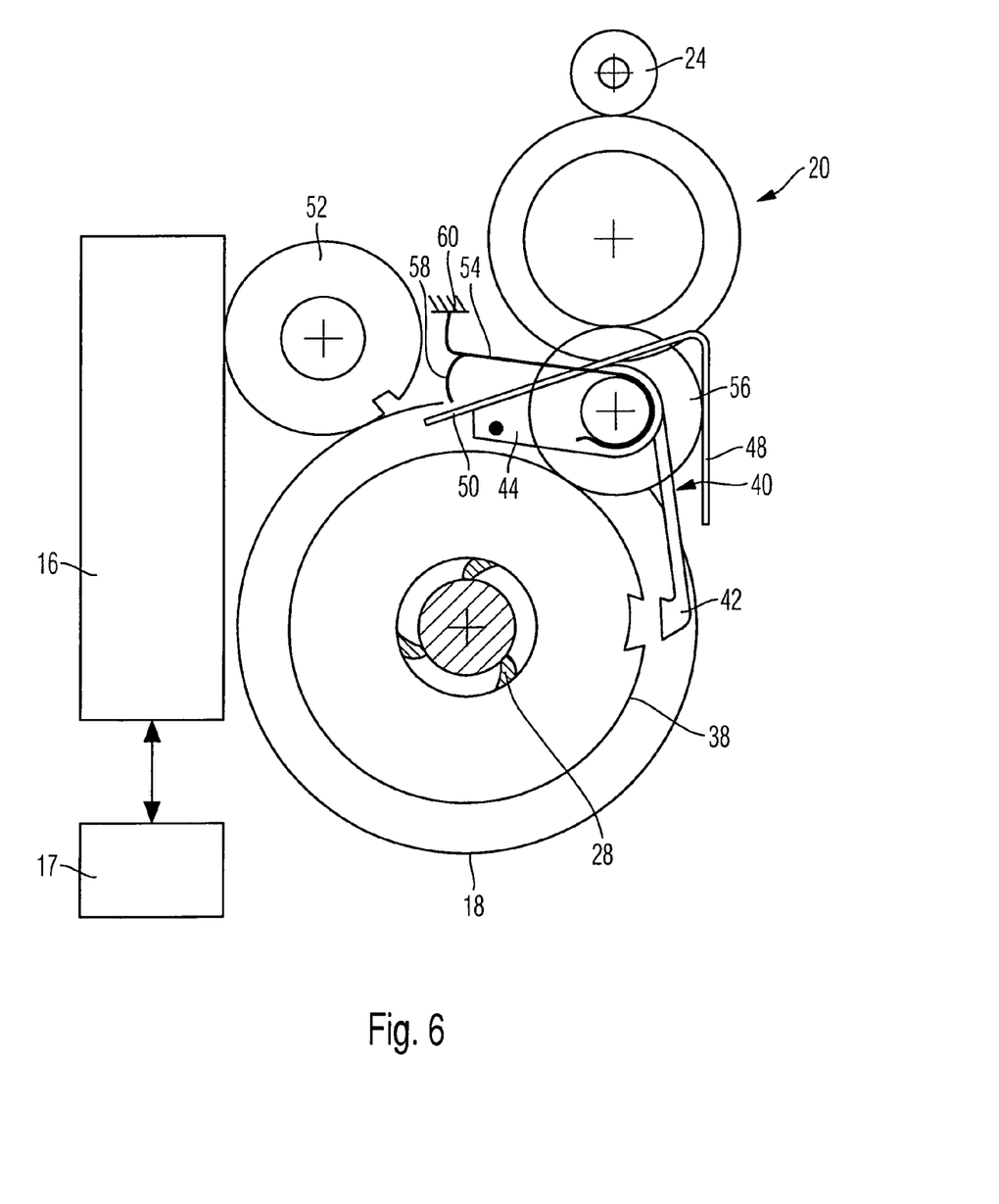
FIG. 6 shows a schematic plan view similar to FIG. 3, but after activation of the irreversible belt tensioning unit.

As soon as the piston 16 has performed a certain stroke after activation of the irreversible belt tensioning unit, the spring arm 50 of the deactivation element 48 is released by the rotation of the gear wheel 52 and moves downwards in anti-clockwise direction. The spring arm 50 acts on the second lever arm 44 of the first brake element 40 and swivels the same in anti-clockwise direction into a passive position, which is shown in FIGS. 5 and 6. In the passive position, the first lever arm 42 of the first brake element 40 no longer engages in the braking teeth 38 of the braking wheel 36. Decoupling the reversible belt tensioning unit from the belt reel 4 is promoted by the fact that the irreversible belt tensioning unit drives the belt reel 4 faster than could be effected by the reversible belt tensioning unit. Thus, a passing maneuver takes place during the irreversible tensioning, in which the coupling mechanism of the reversible belt tensioning unit is passed by the belt reel 4.

After termination of the irreversible belt tensioning, the irreversible belt tensioning unit is decoupled from the belt reel 4.

In the illustrated embodiment, the gear wheel 52 together with the pyrotechnical drive 17 of the irreversible tensioning unit forms an activation means for the deactivation element 48. Alternatively, the deactivation element 48 can of course also be driven by a separate pyrotechnical drive, a lifting or rotating magnet or a small electric motor, in particular when the irreversible belt tensioning unit has no pyrotechnical drive.

To provide for the described deactivation of the first brake element 40 and hence of the entire coupling mechanism, the force exerted by the spring 46 on the first brake element 40 need to be smaller than the prestressing force of the spring arm 50 of the deactivation element 48. The high prestressing force of the spring arm 50 also ensures that the first brake element 40 cannot swivel back as a result of bouncing or the like. Thus, the reversible belt tensioning unit initially is prevented from coupling in again. A force limitation of the blocking system 6 subsequent to the irreversible tensioning operation hence is not influenced by the reversible belt tensioning unit.

For reactivating the reversible belt tensioning unit once an irreversible belt tensioning (and the succeeding force limitation phase) has been effected, the holding element 60, if present, is released and the motor 8, for instance in response to a signal from a control unit which also activates the irreversible tensioning, is rotated back a certain distance (i.e. against the belt tensioning direction). During this reverse rotation of the gear 20, the activation wheel 56 rotates in anti-clockwise direction and due to the friction clutch now entrains the released second brake element 54 into its activated position (see FIG. 7).

Figure 7:
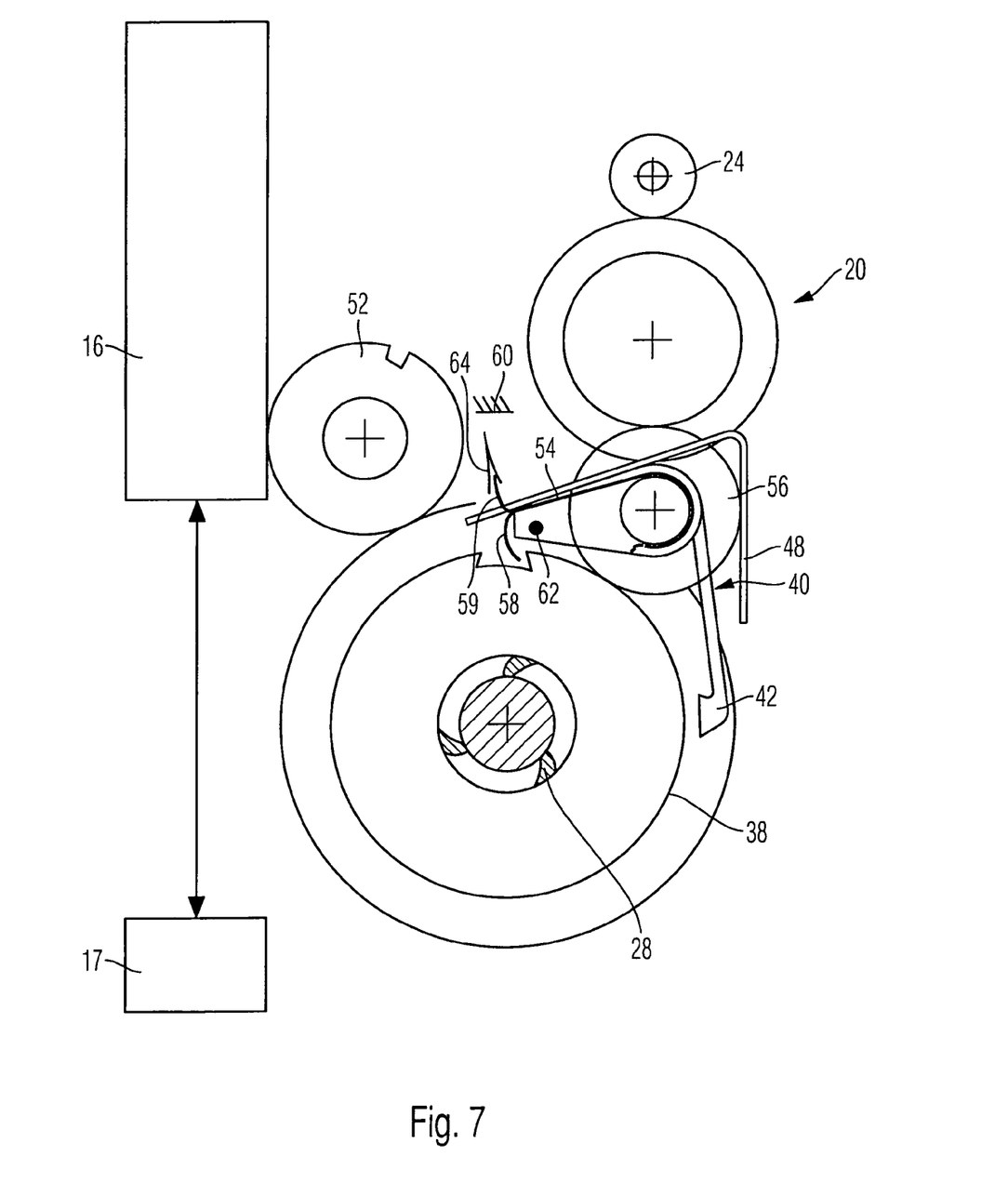
FIG. 7 shows a schematic plan view similar to FIG. 6 after reactivation of the coupling mechanism of the reversible belt tensioning unit.

If the second brake element 54 alternatively has been fixed in the passive position via the holding pin 62 on the first brake element 40, it likewise can move into its activated position after swivelling the first brake element 40, as shown in FIG. 7.

In the activated position, the second brake element 54, to be more precise the first hook 58 thereof, engages in the braking teeth 38 and, in the case of an activation of the motor 8 in tensioning direction, in which the activation wheel 56 rotates in clockwise direction, therefore can cause a coupling between the reversible belt tensioning unit and the belt reel. To prevent the second brake element 54 from again moving out of its activated position when the activation wheel 56 rotates in clockwise direction, a blocking element 64 is provided, which fixes the second brake element 54 in the activated position, once it has reached the same.

Thus, in the belt retractor of the present invention, the coupling mechanism between the reversible belt tensioning unit and the belt reel 4 is deactivated when the irreversible belt tensioning unit is activated and the coupling mechanism is reactivated after termination of the irreversible belt tensioning.

Instead of a mere reverse rotation of the motor 8 it is conceivable to start a complete reversible tensioning cycle for reactivating the coupling mechanism, wherein the gear 20 initially idles during the forward rotation of the motor 8 and during the subsequent reverse rotation, which belongs to the tensioning cycle, the second brake element 54 is engaged in the braking teeth 38. The control of such a complete tensioning cycle usually is easier to realize.

In contrast to the aspect illustrated in the Figures, the first brake element 40 can also be arranged on the activation wheel 56 and be connected with the same via a friction clutch. In this case, the spring 46 is omitted, and when the activation wheel 56 is rotated in clockwise direction, the first brake element 40 is engaged in the braking teeth 38. In this aspect it is necessary that the second brake element 54 is initially held in its passive position by the holding element 60.

The invention claimed is:

1. A belt retractor for a safety belt system, comprising
a frame (2),
a belt reel (4) rotatably mounted in said frame (2) for receiving a belt webbing,
a reversible belt tensioning unit with a motor (8),
an irreversible belt tensioning unit, and
a coupling mechanism, by which said reversible belt tensioning unit is coupled to said belt reel (4) and which is switchable between a deactivated mode and an activated mode,
said coupling mechanism being activated prior to activation of said irreversible belt tensioning unit and being deactivated when said irreversible belt tensioning unit is activated, said coupling mechanism being reactivated after termination of said irreversible belt tensioning unit activation.

2. The belt retractor according to claim 1, wherein said irreversible belt tensioning unit is decoupled from said belt reel (4) after termination of said irreversible belt tensioning unit.

3. The belt retractor according to claim 1, wherein a clutch disk (30), a first brake element (40) and a deactivation element (48) are provided, said coupling mechanism includes said clutch disk (30) and said first brake element (40) for said clutch disk (30) and said deactivation element (48) moving said first brake element (40) into a passive position in which said first brake element (40) does not act on said clutch disk (30) when said irreversible belt tensioning unit is activated.

4. The belt retractor according to claim 3, wherein a prestressed spring arm (50) and a gear wheel (52) are provided, said deactivation element (48) including said prestressed spring arm (50), which is released by said gear wheel (52) coupled with said irreversible belt tensioning unit.

5. The belt retractor according to claim 3, wherein said brake element (40) is pivotally mounted on said frame (2).

6. The belt retractor according to claim 1, wherein said coupling mechanism couples said reversible belt tensioning unit to said belt reel (4) when activated and decouples said reversible belt tensioning unit from said belt reel when deactivated, said reversible belt tensioning unit being configured as a pretensioner that is activated to tension the belt from a first position to a second position in response to a first critical vehicle situation signal and then returning the belt to said first position, said irreversible belt tensioning unit being activated to only tension the belt in response to a second critical vehicle situation signal.

7. The belt retractor according to claim 6, wherein the second critical vehicle situation signal is indicative of an accident of the vehicle.

8. The belt retractor according to claim 6, including a force limitation system that is configured to permit a predetermine withdrawal of the belt to limit the force exerted by the belt onto a body, said coupling mechanism when deactivated exerts no influence on the force needed for the predetermine withdrawal of the belt to limit the force exerted by the belt onto the body.

9. The belt retractor according to claim 1, wherein said reactivation of said coupling mechanism after termination of said irreversible belt tensioning is driven by a rotation of said motor (8).

10. A belt retractor for a safety belt system, comprising:
a frame (2),
a belt reel (4) rotatably mounted in said frame (2) for receiving a belt webbing,
a reversible belt tensioning unit with a motor (8),
an irreversible belt tensioning unit, and
a coupling mechanism, by which said reversible belt tensioning unit can be coupled to said belt reel (4) and which can be deactivated and reactivated,
said coupling mechanism being deactivated when said irreversible belt tensioning unit is activated and said coupling mechanism being reactivated after termination of said irreversible belt tensioning unit,
wherein a clutch disk (30), a first brake element (40) and a deactivation element (48) are provided, said coupling mechanism includes said clutch disk (30) and said first brake element (40) for said clutch disk (30) and said deactivation element (48) moving said first brake element (40) into a passive position in which said first brake element (40) does not act on said clutch disk (30) when said irreversible belt tensioning unit is activated,
wherein a second brake element (54) is provided, which initially is held in a passive position in which it does not act on said clutch disk (30) and after termination of said irreversible belt tensioning unit acts on said clutch disk (30).

11. The belt retractor according to claim 10, wherein an activation wheel (56) driven by said motor (8) is provided, said second brake element (54) being arranged on said activation wheel (56).

12. The belt retractor according to claim 11, wherein a gear (20) connects said activation wheel (56) with said motor (8).

13. The belt retractor according to claim 12, wherein said second brake element (54) can be transferred from a passive position into an activated position by a reverse rotation of said gear (20).

14. The belt retractor according to claim 10, wherein a releasable holding element (60) is provided and mounted on said frame (2), said second brake element (54) being held in the passive position of said second brake element (54) by said holding element (60).

15. The belt retractor according to claim 10, wherein said second brake element (54) is held in the passive position of said second brake element (54) by said first brake element (40).

16. The belt retractor according to claim 10, wherein a blocking element (64) is provided, which fixes said second brake element (54) in an activated position after activation thereof.

17. The belt retractor according to claim 10, wherein braking teeth (38) are provided and both brake elements (40, 54) constitute levers (42, 58), said levers (42, 58) engaging in said braking teeth (38) coupled with said clutch disk (30) in their respective activated position.

18. A belt retractor for a safety belt system, comprising:
a frame (2), a belt reel (4) rotatably mounted in said frame (2) for receiving a belt webbing, a reversible belt tensioning unit with a motor (8), an irreversible belt tensioning unit, and a coupling mechanism, by which said reversible belt tensioning unit can be coupled to said belt reel (4) and which can be deactivated and reactivated, said coupling mechanism being deactivated when said irreversible belt tensioning unit is activated and said coupling mechanism being reactivated after termination of said irreversible belt tensioning unit, wherein a clutch disk (30), a first brake element (40) and a deactivation element (48) are provided, said coupling mechanism includes said clutch disk (30) and said first brake element (40) for said clutch disk (30) and said deactivation element (48) moving said first brake element (40) into a passive position in which said first brake element (40) does not act on said clutch disk (30) when said irreversible belt tensioning unit is activated, wherein a spring (46) is provided, which urges said first brake element (40) into the activated position of said first brake element (40).

19. The belt retractor according to claim 18, wherein a force exerted by said spring (46) on said first brake element (40) is smaller than a prestressing force of said spring arm (50) of said deactivation element (48).

20. The belt retractor according to claim 19, wherein a force exerted by said spring (46) on said first brake element (40) is greater than a frictional force between said second brake element (54) and said activation wheel (56).

21. The belt retractor according to claim 20, wherein said first brake element (40) is mounted on said activation wheel (56) driven by said motor (8).

* * * * *